May 22, 1934.  D. STENHOUSE  1,959,506
PNEUMATIC GLASS FEEDER
Filed May 3, 1930
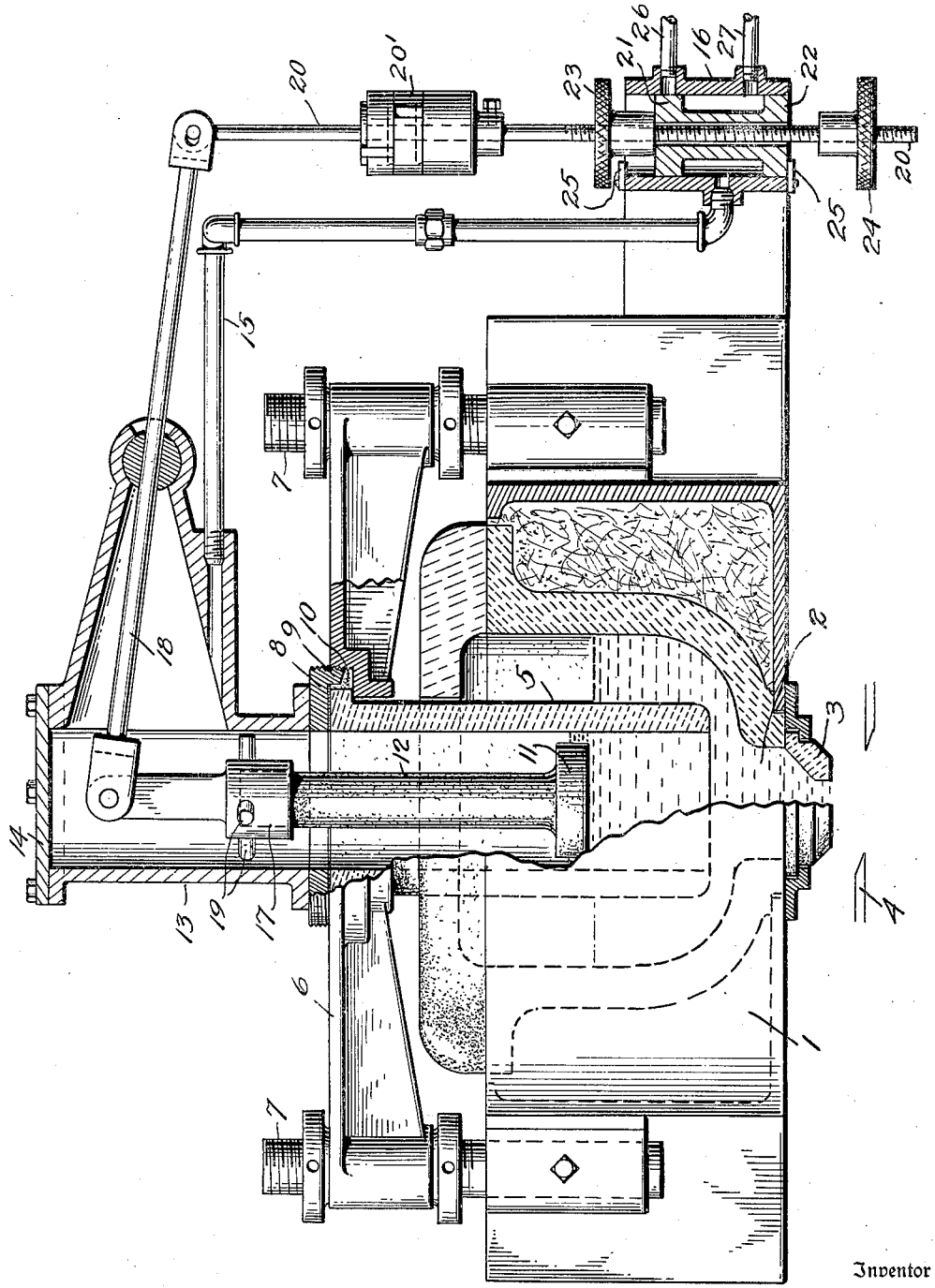
Inventor
David Stenhouse
By
Eccleston + Eccleston
Attorneys Patented May 22, 1934

1,959,506

UNITED STATES PATENT OFFICE 1,959,506

PNEUMATIC GLASS FEEDER

David Stenhouse, Washington, Pa., assignor to Hazel-Atlas Glass Co., Wheeling, W. Va., a corporation of West Virginia Application May 3, 1930, Serial No. 449,488

8 Claims. (Cl. 49—55)

The invention relates generally to that type of feeder in which glass charges are formed by periodically increasing and decreasing the pressure of air on the body of glass. Feeders of the pressure and vacuum type are old and well known; and have been very successful in commercial operation. However, such feeders must be operated with care; for otherwise it is possible that the body of glass may gradually rise, due to a building up of vacuum, or may gradually fall, due to a building up of pressure.

In accordance with the present invention, means is provided to prevent the glass from rising above a predetermined level, or from falling below a predetermined level. That is, the degree of vacuum may be increased or decreased, or the duration of the application of the vacuum may be increased or decreased, or the viscosity of the glass may increase or decrease, yet the glass will not be raised above a certain predetermined level, by reason of mechanism which is controlled by the level of the glass. Likewise, the pressure on the glass may be increased or decreased, and the duration of the application of pressure may be increased or decreased, and the viscosity of the glass may be increased or decreased, without the glass being lowered below a certain predetermined level. In other words, in the present invention, the rise of the glass to a certain level will automatically cause the application of vacuum to cease; and the fall of the glass to a certain level will cause the application of pressure to cease; the controlling means being operated by the level of the glass.

While in accordance with this invention the glass is automatically prevented from rising above a certain level, or falling below a certain level, yet the invention also provides for varying the level to which the glass may rise or fall, for varying the period during which the vacuum is applied, the period during which the pressure is applied, etc.

No claim is made herein to the broad idea of automatically controlling the level of the glass, as such broad subject-matter is disclosed and claimed in an application of Thomas Stenhouse, Serial No. 444,808, filed April 16, 1930.

The invention will be understood from the following description, when taken in connection with the accompanying drawing; in which The figure is a vertical sectional view of the feeder and flow spout.

Numeral 1 indicates a conventional flow spout having a flow orifice 2 provided with a removable bushing 3. Conventional shears, diagrammatically illustrated and referred to by numeral 4, are arranged below the flow orifice for severing the formed charges, which then drop into molds, in the usual manner.

Mounted in the flow spout in substantial alignment with the flow orifice is the usual pressure and vacuum tube 5, which projects downwardly into the glass to a point adjacent the floor of the flow spout. The distance of the lower end of the tube from the floor of the flow spout may be fixed or variable. In the form illustrated the tube may be adjusted vertically, and for that purpose the refractory tube has its upper end mounted on a metallic frame 6, which frame is mounted for vertical adjustment on threaded posts 7, 7. The tube is secured to the frame and an air-tight connection formed between them, by any desired means, such as by ring 8 which engages over the top of the tube and has a depending flange 9 which is threaded into the frame; the depending flange forcing the packing 10 into place to form a seal between the tube and the frame.

Numeral 11 refers to a float of refractory material which is adapted to float on the glass in the tube, and rise and fall with the glass, as the pressure of the air in the tube is periodically decreased and increased. The float may be of a disc shape, as illustrated, or of any other desired shape, and is provided with an upwardly extending shank 12, which is also preferably made of refractory material, though it may be of any other suitable material, as it is not in contact with the glass.

A metallic housing 13, having its interior communicating with the interior of the pressure and vacuum tube, is mounted on the ring 8 in any desired manner, by an air-tight connection; and has its upper end closed by a removable plate 14. A pipe 15 communicates with the interior of the housing and tube and the opposite end of the pipe is connected with a valve casing 16. By mechanism to be described hereinafter, the pipe 15 is alternately connected with sources of pressure and vacuum, whereby the pressure in the tube and housing is periodically varied above and below atmospheric pressure.

The shank 12 of the float is attached at its upper end to a socket member 17, which is pivotally attached to the inner end of a lever 18, which is journaled in the housing. To prevent the float from swinging into contact with the wall of the tube, the socket member may be provided with pins 19 which extend outwardly almost to the wall of the housing.

Suspended from the outer end of the lever 18 is a rod 20, which is provided with a variable counterweight 20', and which has its lower portion threaded. Slidably mounted in the valve casing 16 is a valve body having upper and lower valves 21 and 22, respectively. The valve body is centrally cored to permit the rod 20 to extend loosely therethrough. The rod 20 has a variable lost motion connection with the valve body, by means of nuts 23 and 24 which are threaded on the rod above and below the valve body, respectively. In order to prevent the valve body from being raised or lowered beyond the limits of the valve casing, in the operation of the feeder, stops 25 are provided at the top and bottom of the casing. When the valve body is to be removed for repair or replacement, it is only necessary to swing these stops to one side.

A pipe 26, communicating with a source of vacuum, enters the upper portion of the valve casing, adjacent the valve 21; and a pipe 27, communicating with a source of pressure, enters the lower portion of the valve casing adjacent the valve 22.

When the double valve is in the position shown in the drawing, the application of vacuum is shut off, and the pressure from pipe 27 passes freely through the valve casing 16, pipe 15 and housing 13 to the interior of the tube 5. When the double valve is lifted, by reason of the lowering of the glass level and float, the application of pressure will be shut off, and pipe 26 will be thrown into communication with the interior of the tube, whereby it is vacuumized to the desired degree. By adjusting one or both of the nuts 23, 24, it is possible to vary the level to which the glass is permitted to rise or fall, to vary the duration of the application of pressure or vacuum, or to vary the beginning or the ending of the application of the pressure or vacuum. In the form illustrated herein the float is operatively connected with the double valve by means of the lever 18; but obviously the lever could be omitted and the valve be arranged over the float and having a direct connection therewith by means of a rod or the like; any suitable counterbalance device being employed.

The operation of the feeder will now be briefly described.

The parts are shown in the drawings in the positions they assume when the glass has risen to the desired level. That is, the vacuum has been applied to lift the glass in the tube, and this has caused the shifting of the valve to the position shown in the figure, so that pressure from the pipe 27 is passing freely through the valve casing to the interior of the tube 5. This pressure acting on the glass in the tube will force the glass downward, thereby accelerating the flow of glass through the flow orifice 2. The extent to which the level of glass is lowered in the tube will depend upon the pressure of the air admitted to the tube, the length of time the glass is subjected to the pressure, and the temperature and viscosity of the glass.

In accordance with the present invention, as soon as the glass has fallen to a predetermined level, or in other words, when the desired amount of glass has passed through the bushing 3, the pressure will be automatically shut off. This highly desirable function is accomplished by the float 7 which floats downwardly with the glass, and just as it is about to reach the desired level, the nut 24 will come into contact with the double valve and shift its position, so that communication between tube 5 and pipe 27 is shut off, and communication between the tube and pipe 26, is opened, whereby suction is applied to the interior of the tube. Thus the glass will not fall below this predetermined level.

The level of the glass at which the pressure is shut off depends upon the position of the nut 24 on the rod 20. So that by the mere adjustment of this nut up or down on the rod 20, the level to which the glass is permitted to descend will be raised or lowered. Or, the level to which the glass is permitted to descend may be maintained, and the extent of rise and fall of the glass may be varied by adjusting the nut 23. By adjusting both of these nuts, in the same direction or in opposite directions, any intermediate action may be obtained.

The double valve having been shifted by the fall of the float, the pipe 26 which communicates with a source of vacuum, such as a vacuum pump, or vacuum tank, is thrown into communication with the interior of the tube. The air will thus be withdrawn from the tube and the glass will rise therein. The glass cannot, however, rise above a predetermined level, no matter how high the degree of vacuum may be, how long it is applied, or what the temperature and viscosity of the glass may be. For just as the glass has risen to about the predetermined level, the float, which rises with the glass, will cause the nut 23 to engage the double valve and shift its position to that shown in the drawing, thus shutting off communication with the source of vacuum, and admitting pressure to the interior of the tube.

Any variations in the temperature and viscosity of the glass, are automatically taken care of in the present feeder, for if the temperature and viscosity changes so that the weight of the charge would ordinarily be reduced, the pressure will automatically continue in action longer, thus obtaining the same weight of charge; and if the temperature and viscosity change so that ordinarily the charge would be overweight, the duration of the pressure will automatically be reduced accordingly. So that while I have particularly described the apparatus as automatically controlling the pressure and vacuum in accordance with the rise and fall of the glass, it will be understood that it is substantially the equivalent of automatically controlling the pressure and vacuum to maintain the desired weight of charges.

The level to which the glass is permitted to rise, may be varied by adjusting the nut 23 up or down. Or, the level to which the glass is permitted to rise may be maintained, and the extent of rise and fall of the glass may be varied by adjusting the nut 24. By adjusting both of these nuts, in the same direction or in opposite directions, any intermediate action may be obtained.

The severing of the charges has not been described; it being understood that the charges, when formed, are severed in the usual manner.

While the broad idea of automatically controlling the level of the glass, is disclosed in Thomas Stenhouse application Serial No. 444,808, referred to hereinbefore; yet it is to be understood that the present invention constitutes a wide departure from the disclosure of such prior application. In fact, the apparatus disclosed herein, for controlling the vacuum and pressure, and the manner of making adjustments, bear little if any similarity to the disclosure of said prior application. Many changes and modifications may be made in the apparatus without departing from the spirit of the invention, and all such changes and modifications are intended to be included within the scope of the appended claims.

What I claim is:

1. A pneumatic glass feeder including a flow spout having a flow orifice, a pressure and vacuum tube projecting into the glass and in substantial alignment with the flow orifice, a float in contact with the glass, valves controlling the pressure and vacuum conditions in the tube to form suspended charges below the orifice, shears for severing the formed charges, and a lost motion connection between the float and the valves for controlling the level to which the glass is permitted to rise or fall.

2. A pneumatic glass feeder including a flow spout having a flow orifice, a pressure and vacuum tube projecting into the glass and in substantial alignment with the flow orifice, a float in contact with the glass, valves controlling the pressure and vacuum conditions in the tube to form suspended charges below the orifice, shears for severing the suspended charges, and a variable lost motion connection between the float and the valves for varying the level to which the glass is permitted to rise or fall.

3. A pneumatic glass feeder including a flow spout having a flow orifice, a pressure and vacuum tube projecting into the glass and in substantial alignment with the flow orifice, a float in contact with the glass in the tube, a valve connecting sources of pressure and vacuum alternately with the interior of the tube to aid in the formation of suspended charges below the orifice, shears for severing the suspended charges, a rod operated by the float, a lost motion connection between the rod and the valve for controlling the level to which the glass is permitted to rise or fall, the connection including spaced abutments moved by said rod into engagement with the valve for shifting the valve's position.

4. A pneumatic glass feeder including a flow spout having a flow orifice, a pressure and vacuum tube projecting into the glass in substantial alignment with the flow orifice, a float in contact with the glass in the tube, a valve connecting sources of pressure and vacuum alternately with the interior of the tube to aid in the formation of suspended charges below the orifice, shears for severing the suspended charges, a rod operated by the float, and a variable lost motion connection between the rod and the valve for varying the level to which the glass is permitted to rise or fall, the connection including adjustably spaced abutments moved by said rod into engagement with the valve for shifting the valve's position.

5. A pneumatic glass feeder including a flow spout having a flow orifice, a pressure and vacuum tube projecting into the glass in substantial alignment with the flow orifice, a float in contact with the glass in the tube, a lever, said float connected with one arm of said lever, a rod suspended from the other arm of the lever, a variable counterweight carried by said rod, a valve connecting sources of pressure and vacuum alternately with the interior of the tube to aid in the formation of suspended charges below the orifice, shears for severing the suspended charges, said rod passing loosely through said valve, and a variable lost motion connection between the rod and the valve for varying the level to which the glass is permitted to rise or fall, said connection including adjustable nuts mounted on the rod above and below said valve.

6. A pneumatic glass feeder including a flow spout having a flow orifice, a valve shiftable to cause the flow spout to communicate alternately with a source of pressure and a source of vacuum to aid in the formation of suspended charges below the orifice, shears for severing the suspended charges, and a lost motion connection for operating the valve by the rise and fall of the glass, said lost motion connection controlling the level to which the glass is permitted to rise or fall.

7. A pneumatic glass feeder including a flow spout having a flow orifice, a valve shiftable to cause the flow spout to communicate alternately with a source of pressure and a source of vacuum to aid in the formation of suspended charges below the orifice, shears for severing the suspended charges, and a lost motion connection for shifting the valve by the rise and fall of the glass, said lost motion connection being adjustable to vary the level to which the glass must rise to effect a shifting of the valve.

8. A pneumatic glass feeder including a flow spout having a flow orifice, a valve shiftable to cause the flow spout to communicate alternately with a source of pressure and a source of vacuum to aid in the formation of charges suspended below the orifice, shears for severing the suspended charges, and a lost motion connection for shifting the valve by the rise and fall of the glass, said lost motion connection being adjustable to vary the level to which the glass must fall to effect a shifting of the valve.

DAVID STENHOUSE.